(12) United States Patent
Houtman et al.

(10) Patent No.: US 7,653,470 B2
(45) Date of Patent: Jan. 26, 2010

(54) METHOD TO PREVENT CHAIN JUMP IN A DRIVETRAIN

(75) Inventors: Steven T Houtman, South Lyon, MI (US); Joseph Roy, Southfield, MI (US); Mark Thompson, Windsor (CA)

(73) Assignee: Chrysler Group LLC, Auburn Hills, MI (US)

(*) Notice: Subject to any disclaimer, the term of this patent is extended or adjusted under 35 U.S.C. 154(b) by 737 days.

(21) Appl. No.: 11/114,756

(22) Filed: Apr. 26, 2005

(65) Prior Publication Data

US 2006/0241842 A1 Oct. 26, 2006

(51) Int. Cl.
*G06F 17/00* (2006.01)
*F16H 48/20* (2006.01)

(52) U.S. Cl. .................................. 701/69; 475/231

(58) Field of Classification Search .................. 701/36, 701/48, 51, 52, 53, 58, 62, 65, 66, 67, 69, 701/82, 88, 89; 475/231; 474/144
See application file for complete search history.

(56) References Cited

U.S. PATENT DOCUMENTS

| | | | |
|---|---|---|---|
| 4,493,387 A * | 1/1985 | Lake et al. .................. 180/248 |
| 4,632,207 A * | 12/1986 | Moore ......................... 180/247 |
| 4,995,862 A * | 2/1991 | Arocha ......................... 475/86 |
| 5,704,444 A * | 1/1998 | Showalter .................... 180/247 |
| 5,809,443 A * | 9/1998 | Perttunen et al. .............. 701/69 |
| 5,954,778 A * | 9/1999 | Rodrigues et al. ............. 701/69 |
| 5,978,726 A * | 11/1999 | Takeda et al. .................. 701/84 |
| 5,979,584 A * | 11/1999 | Glab et al. ................... 180/249 |
| 5,980,415 A * | 11/1999 | Showalter .................... 475/213 |
| 6,047,231 A * | 4/2000 | Rodrigues et al. ............. 701/69 |
| 6,079,535 A | 6/2000 | Mueller et al. .............. 192/48.2 |
| 6,105,702 A * | 8/2000 | Showalter .................... 180/247 |
| 6,213,242 B1 * | 4/2001 | Rodrigues et al. ........... 180/249 |
| 6,487,486 B1 * | 11/2002 | Anderson ..................... 701/69 |

* cited by examiner

*Primary Examiner*—Edward Pipala
(74) *Attorney, Agent, or Firm*—Ralph E. Smith

(57) ABSTRACT

A method to prevent chain jump in a drivetrain of a four-wheel drive vehicle including receiving sensed vehicle parameters from sensors in the four-wheel drive vehicle, generating transfer case chain-jump parameters based on the sensed vehicle parameters and sending a command signal to initiate disengagement of a clutch pack in a transfer case of the drivetrain responsive to the generated transfer case chain-jump parameters.

18 Claims, 4 Drawing Sheets

METHOD TO PREVENT CHAIN JUMP IN A DRIVETRAIN

FIELD OF THE INVENTION

This invention relates generally to vehicle drivetrains. In particular, the invention relates to preventing chain jump in the transfer case of a four-wheel drive vehicle.

BACKGROUND OF THE INVENTION

Conventional part-time four-wheel drive vehicles are typically equipped with a drivetrain to transmit rotary power from the power train to a front pair of drive wheels and a rear pair of drive wheels. The front axle assembly is connected to a front driveshaft and the rear axle assembly is connected to a rear driveshaft. In four-wheel drive mode, the front driveshaft and the rear driveshaft are locked together in order to rotate at the same rate. The locking mechanism is in the transfer case and includes a chain connecting the front driveshaft to the rear driveshaft via a drive sprocket and a driven sprocket.

In many four-wheel drive vehicles, the front brake system is larger than the rear brake system. In this case, when the brakes are applied, the front wheels stop rotating before the rear wheels. When brakes are applied to a vehicle being driven in four-wheel drive mode, the chain in the transfer case sometimes jumps over a tooth on one or both of the drive sprocket and driven sprocket.

In order to prevent chain jump, the chain is modified in various ways, which increase cost and weight with a resultant reduction in fuel efficiency. The chain modifications used to prevent chain jump include increasing the chain width, pitch and strength.

SUMMARY OF THE INVENTION

Accordingly, a method is provided to prevent chain jump in a drivetrain of a four-wheel drive vehicle without modifying the chain in the drivetrain. In a first aspect of the present invention, the method includes receiving sensed vehicle parameters from sensors in the four-wheel drive vehicle, generating transfer case chain-jump parameters based on the sensed vehicle parameters and sending a command signal to initiate disengagement of a clutch pack in a transfer case of the drivetrain responsive to the generated transfer case chain-jump parameters.

A second aspect of the present invention provides computer readable medium storing a computer program. The medium includes computer readable code for receiving sensed vehicle parameters from sensors in a four-wheel drive vehicle, for generating transfer case chain-jump parameters based on the sensed vehicle parameters and for sending a command signal to initiate disengagement of a clutch pack in a transfer case of the drivetrain responsive to the generated transfer case chain-jump parameters.

A third aspect of the present invention provides a system to prevent chain jump in a drivetrain of a four-wheel drive vehicle. The system includes sensors operable to sense vehicle parameters in the four-wheel drive vehicle, a computer operable to receive the sensed vehicle parameters from the sensors, to generate transfer case chain-jump parameters based on the sensed vehicle parameters and to send a command signal to initiate disengagement of a clutch pack in a transfer case of the drivetrain responsive to the generated transfer case chain-jump parameters, and a controller operable to receive the command signal to initiate disengagement of a clutch pack.

BRIEF DESCRIPTION OF THE DRAWINGS

Other aspects, features, and advantages of the present invention will become more fully apparent from the following detailed description of the preferred embodiment, the appended claims, and in the accompanying drawings in which:

DETAILED DESCRIPTION OF THE PREFERRED EMBODIMENTS

Figure 1:
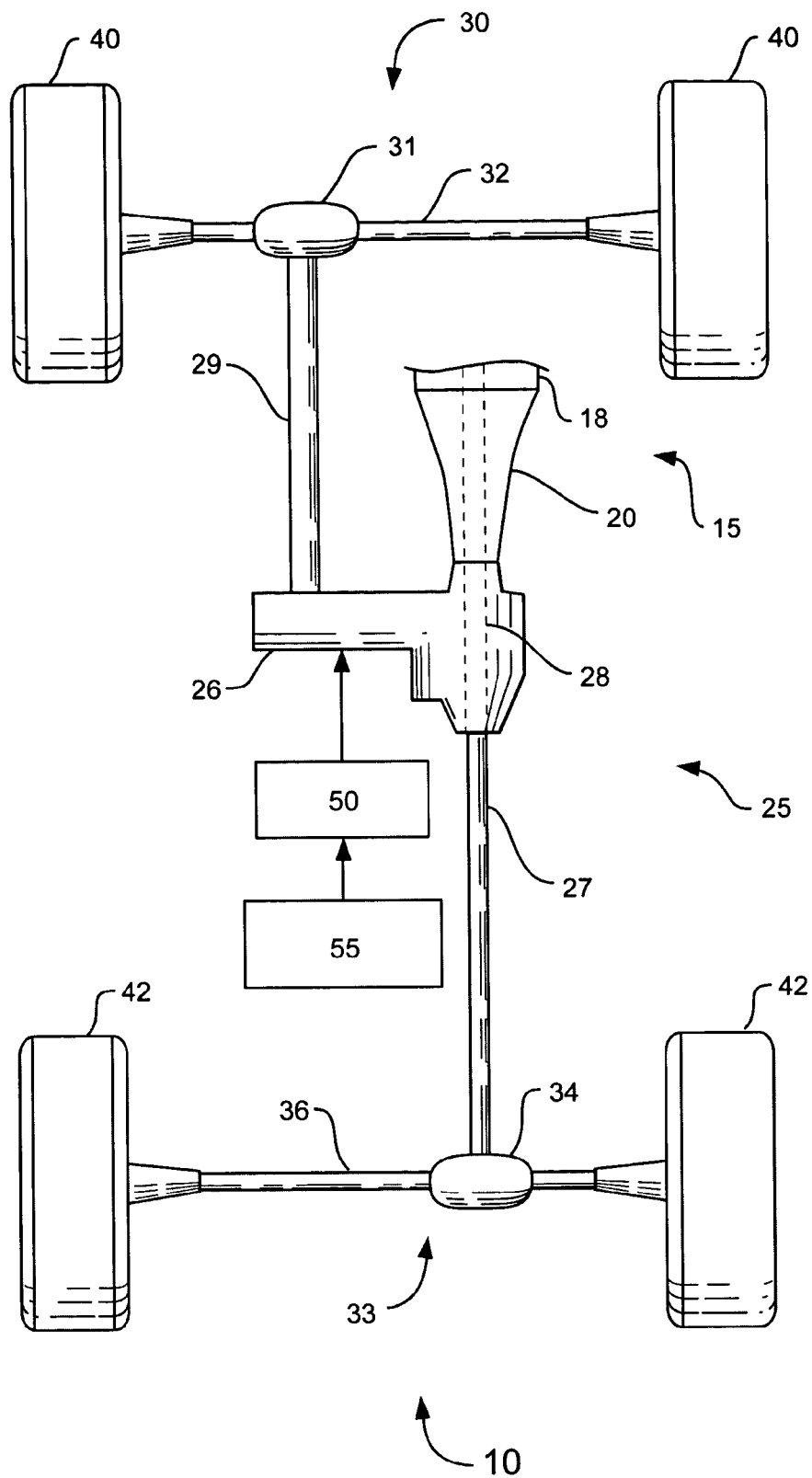
FIG. 1 illustrates a schematic diagram of a system in a four-wheel drive vehicle for preventing chain jump.

In the following description, several well-known features of a transfer case differential and clutch pack are not shown or described so as not to obscure the present invention. FIG. 1 schematically illustrates a power train 15, a drivetrain 25, a computer 50 and a plurality of sensors 55 within a four-wheel drive vehicle 10. The sensors 55 sense vehicle parameters and generate sensor signals that are transmitted to the computer 50. The computer 50 receives the sensed vehicle parameters, generates transfer case chain-jump parameters from the received parameters and sends command signals to a controller 57 (FIG. 2) in the transfer case 26 in response to the generated transfer case chain-jump parameters. The computer 50 is typically in the body of the four-wheel drive vehicle 10. In one embodiment, the computer 50 is under a rear seat in the four-wheel drive vehicle 10.

The power train 15 includes an engine 18 that provides torque to a transmission 20 that multiplies the torque and transfers it to a mainshaft 28. The drivetrain 25 includes the mainshaft 28, a transfer case 26, a rear driveshaft 27, a rear axle assembly 33, a front driveshaft 29, and a front axle assembly 30.

Throughout this document the phrase four-wheel drive vehicle refers to both on-demand four-wheel drive vehicles and active full-time four-wheel drive vehicles unless otherwise indicated.

In one embodiment, the vehicle 10 is an on-demand four-wheel drive vehicle 10, which has rear-wheel drive when in the two-wheel mode. In this case, the mainshaft 28 is connected to the rear driveshaft 27. In two-wheel drive mode for a rear-wheel drive vehicle, the mainshaft 28 rotates at the same speed as the rear driveshaft 27 unless the four-wheel drive vehicle 10 is cornering or slipping.

In another embodiment, the four-wheel drive vehicle 10 is an on-demand four-wheel drive vehicle 10, which has front-wheel drive when in the two-wheel mode. In this case, the mainshaft 28 is connected to the front driveshaft 29. In two-wheel drive mode for a front-wheel drive vehicle, the mainshaft 28 rotates at the same speed as the front driveshaft 29 unless the four-wheel drive vehicle 10 is cornering or slipping.

In yet another embodiment, the four-wheel drive vehicle 10 is an active full-time four-wheel drive vehicle. In this case, the mainshaft 28 can be connected to either the front driveshaft 29 or the rear driveshaft 27. The front driveshaft 29, the rear driveshaft 27 and the mainshaft 28 all rotate at the same speed unless the four-wheel drive vehicle 10 is cornering or slipping.

The front axle assembly 30 includes a front differential 31 and a pair of front wheels 40 connected at opposite ends of a front axle 32. The front driveshaft 29 connects the transfer case 26 to the front differential 31. The rear axle assembly 33 includes the rear differential 34 and a pair of rear wheels 42 connected at opposite ends to a rear axle 36. The rear driveshaft 27 connects the transfer case 26 to the rear differential 34.

A brake system (not shown) includes brakes in each of the wheels in the pair of front wheels 40 and the pair of rear wheels 42. The brake system can be an anti-lock brake system.

The transfer case 26 includes the mechanism, which provides four-wheel drive capability for the four-wheel drive vehicle 10.

In one embodiment, the transfer case 26 includes the mechanism to connect or disconnect the front driveshaft 29 to the mainshaft 28 for on-demand four-wheel drive operation. In another embodiment, the transfer case 26 includes the mechanism to connect or disconnect the rear driveshaft 27 to the mainshaft 28 for on-demand four-wheel drive operation. In these two embodiments, the clutch pack 60 (FIGS. 2 and 3) is either fully engaged or fully disengaged.

In another embodiment, the transfer case 26 includes the mechanism to connect the front driveshaft 29 to the mainshaft 28 for active full time four-wheel drive operation. In yet another embodiment, the transfer case 26 includes the mechanism to connect the rear driveshaft 27 to the mainshaft 28 for active full time four-wheel drive operation. In these two latter embodiments, the clutch pack 60 (FIGS. 2 and 3) is partially engaged or fully engaged with one of the driveshafts.

Figure 2:
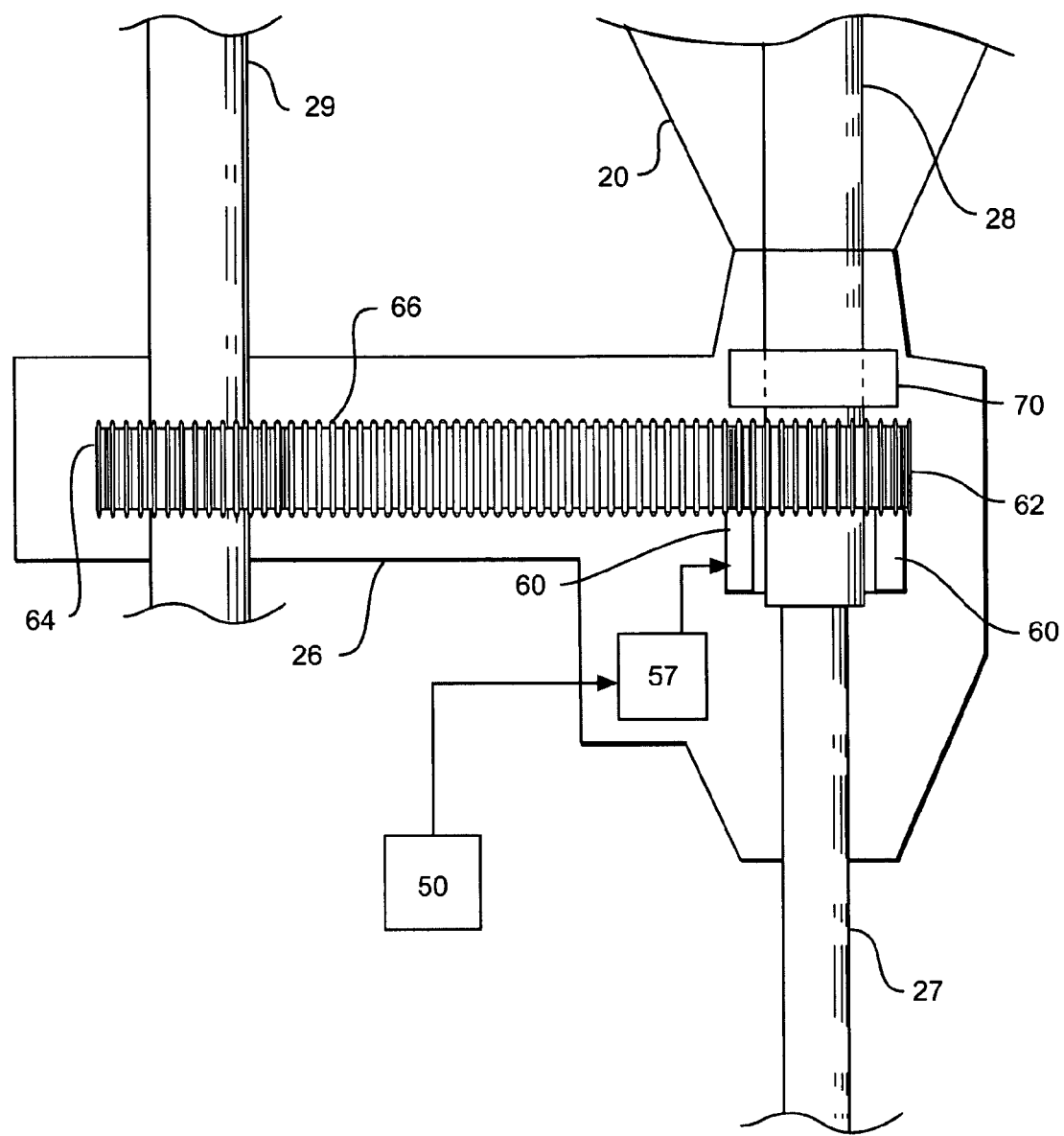
FIG. 2 illustrates a schematic cross-sectional diagram of a transfer case in which the rear driveshaft is disengaged from the front driveshaft in accordance with a first embodiment of the present invention.
Figure 3:
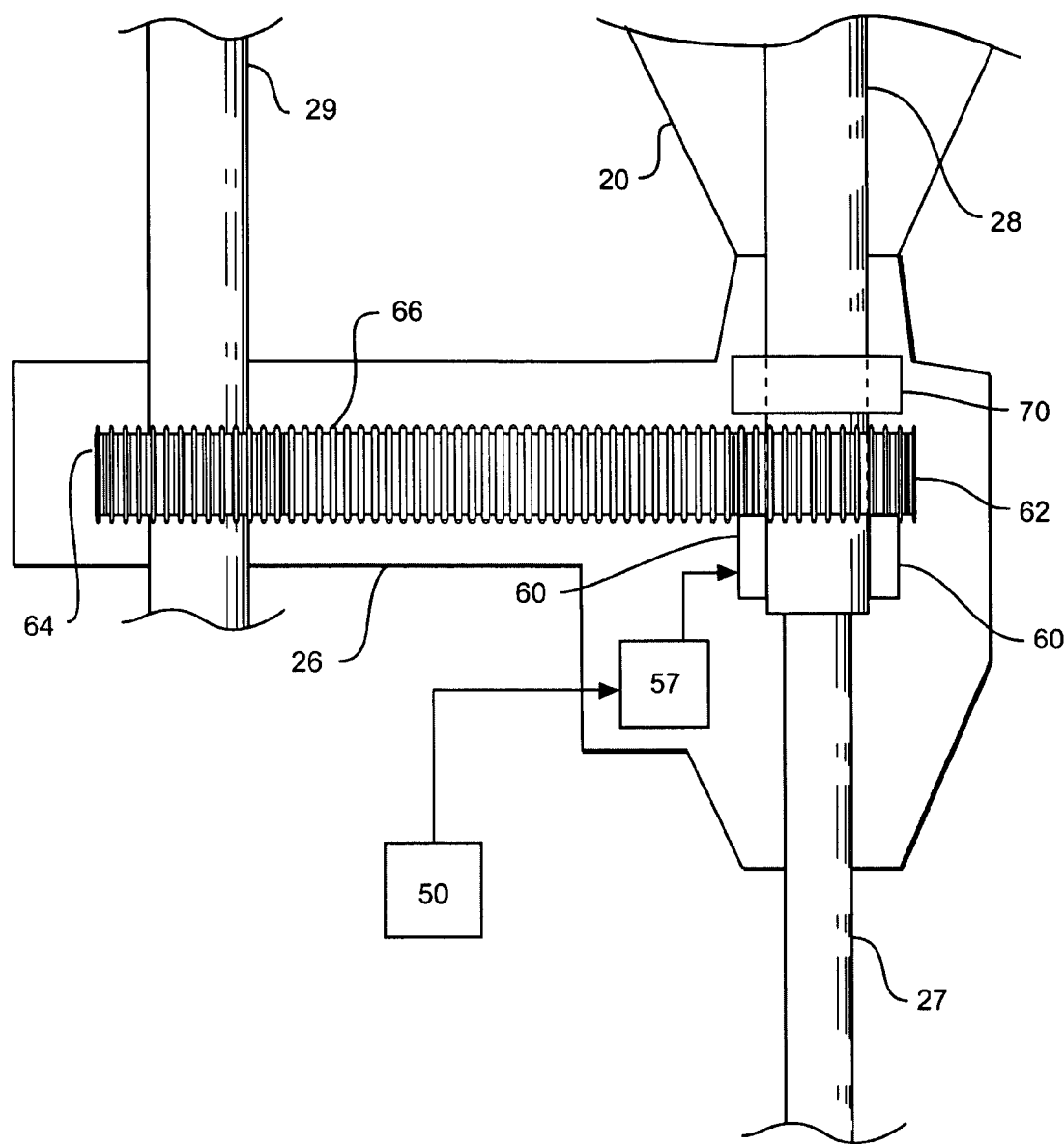
FIG. 3 illustrates a schematic cross-sectional diagram of a transfer case in which the rear driveshaft is engaged with the front driveshaft in accordance with a second embodiment of the present invention.

With reference to FIGS. 2 and 3, the controller 57 is operable to receive command signals from computer 50. The command signals include instructions to engage or disengage the clutch pack 60. The controller 57 is operably connected to the clutch pack 60 to initiate engagement or disengagement of the clutch pack 60 based on the command signals from the computer 50.

FIG. 2 illustrates a schematic cross-sectional diagram of an exemplary transfer case 26 in communication with the computer 50 in which the rear driveshaft 27 is disengaged from the front driveshaft 29 in accordance with a first embodiment of the present invention. In the mode of operation illustrated in FIG. 2, the clutch pack 60 is partially disengaged if the four-wheel drive vehicle 10 is an active full-time four-wheel drive vehicle. In the mode of operation illustrated in FIG. 2, the clutch pack 60 is disengaged if the four-wheel drive vehicle 10 is an on-demand four-wheel drive vehicle.

Throughout this document, the phrase "disengaged" refers to both partially disengaged in an active full-time four-wheel drive vehicle and completely disengaged in an on-demand four-wheel drive vehicle. Likewise, the phrase "disengagement" refers to both partial disengagement in an active full-time four-wheel drive vehicle and complete disengagement in an on-demand four-wheel drive vehicle.

The mainshaft 28 and the rear driveshaft 27 are connected to each other and rotate with the same angular velocity unless one of the wheels in the pair of rear wheels 42 and/or the pair of front wheels 40 are slipping or turning. The angular velocity of the rear driveshaft 27 is translated into angular velocity in the pair of rear wheels 42, via the rear axle assembly 33. As the four-wheel drive vehicle 10 moves in response to the angular velocity in the pair of rear wheels 42, the pair of front wheels 40 rotate in response to the vehicle movement, but the engine 18 is not driving the pair of front wheels 40. In this embodiment, the four-wheel drive vehicle 10 is an on-demand four-wheel drive vehicle functioning in the two-wheel drive mode. An active full-time four-wheel drive vehicle does not operate in two-wheel drive mode but rather operates in a mode of partial disengagement of the clutch pack 60, as known in the art.

The connecting/disconnecting mechanism of the transfer case 26 includes a drive sprocket 62, a clutch pack 60, a driven sprocket 64, and a chain 66. If the four-wheel drive vehicle 10 is an active full-time four-wheel drive vehicle, the transfer case 26 also includes a center differential 70, which encircles the mainshaft 28. The center differential 70 is shown in FIG. 2 between the drive sprocket 62 and the transmission 20 (FIG. 1), however the position can vary and is dependent upon the design of the four-wheel drive vehicle 10 and the package of the transfer case 26.

The drive sprocket 62 encircles and is attached to a central portion of the length of the mainshaft 28 and has teeth (not shown). The drive sprocket 62 is mechanically connected to a chain 66, which is mechanically connected to a driven sprocket 64. The driven sprocket 64 is mechanically connected to the front driveshaft 29 of the drivetrain 25. As illustrated, the driven sprocket 64 encircles and is attached to a central portion of the length of the front driveshaft 29 and has teeth (not shown).

When the clutch pack 60 is disengaged, the clutch pack 60 does not engage with the mainshaft 28 so there is no mechanical attachment of the drive sprocket 62 to the mainshaft 28. Thus, when the clutch pack 60 is disengaged, the drive sprocket 62 is not forced to rotate with the same angular velocity as the mainshaft 28 and the rear driveshaft 27. Typically, the drive sprocket 62 does rotate with the same angular velocity as the mainshaft 28 and the rear driveshaft 27 unless the four-wheel-drive vehicle 10 is cornering or slipping.

When the four-wheel drive vehicle 10 is an active full-time four-wheel drive vehicle, the disengaging of a drive sprocket 62 from one of the rear driveshaft 27 or the front driveshaft 29 of the drivetrain 25 is a partial disengaging of the drive sprocket 62 from one of the rear driveshaft 27 or the front driveshaft 29. The center differential 70 used in active full-time four-wheel drive operation allows the front driveshaft 29 and the rear driveshaft 27 to rotate at different angular velocities, however the average combined angular velocity of the front driveshaft 29 and the rear driveshaft 27 is constant when the four-wheel drive vehicle 10 is driven at a constant velocity.

FIG. 3 illustrates a schematic cross-sectional diagram of an exemplary transfer case 26 in communication with computer 50 in which the rear driveshaft 27 is engaged with the front driveshaft 29 in accordance with a second embodiment of the present invention. The transfer case 26 was described above with reference to FIG. 2. When the clutch pack 60 is engaged, the drive sprocket 62 is engaged with the mainshaft 28 and/or the center differential 70 to provide a mechanical attachment between the mainshaft 28 and the drive sprocket 62. In this manner the drive sprocket 62 is forced to rotate with the same angular velocity as the mainshaft 28. The drive sprocket 62 is mechanically connected to the chain 66, which is also mechanically connected to the driven sprocket 64. The driven sprocket 64 is mechanically connected to the front driveshaft 29 of the drivetrain 25. Thus the engagement of the clutch pack 60 is operable to mechanically connect the rear driveshaft 27 to the front driveshaft 29 so that the rear driveshaft 27 and the front driveshaft 29 rotate at the same speed. In this embodiment, the four-wheel drive is functioning in the four-wheel drive mode.

When the four-wheel drive vehicle 10 is an active full-time four-wheel drive vehicle the engaging of a drive sprocket 62 with one of the rear driveshaft 27 or the front driveshaft 29 of the drivetrain 25 is a fully engaging of the drive sprocket 62.

Figure 4:
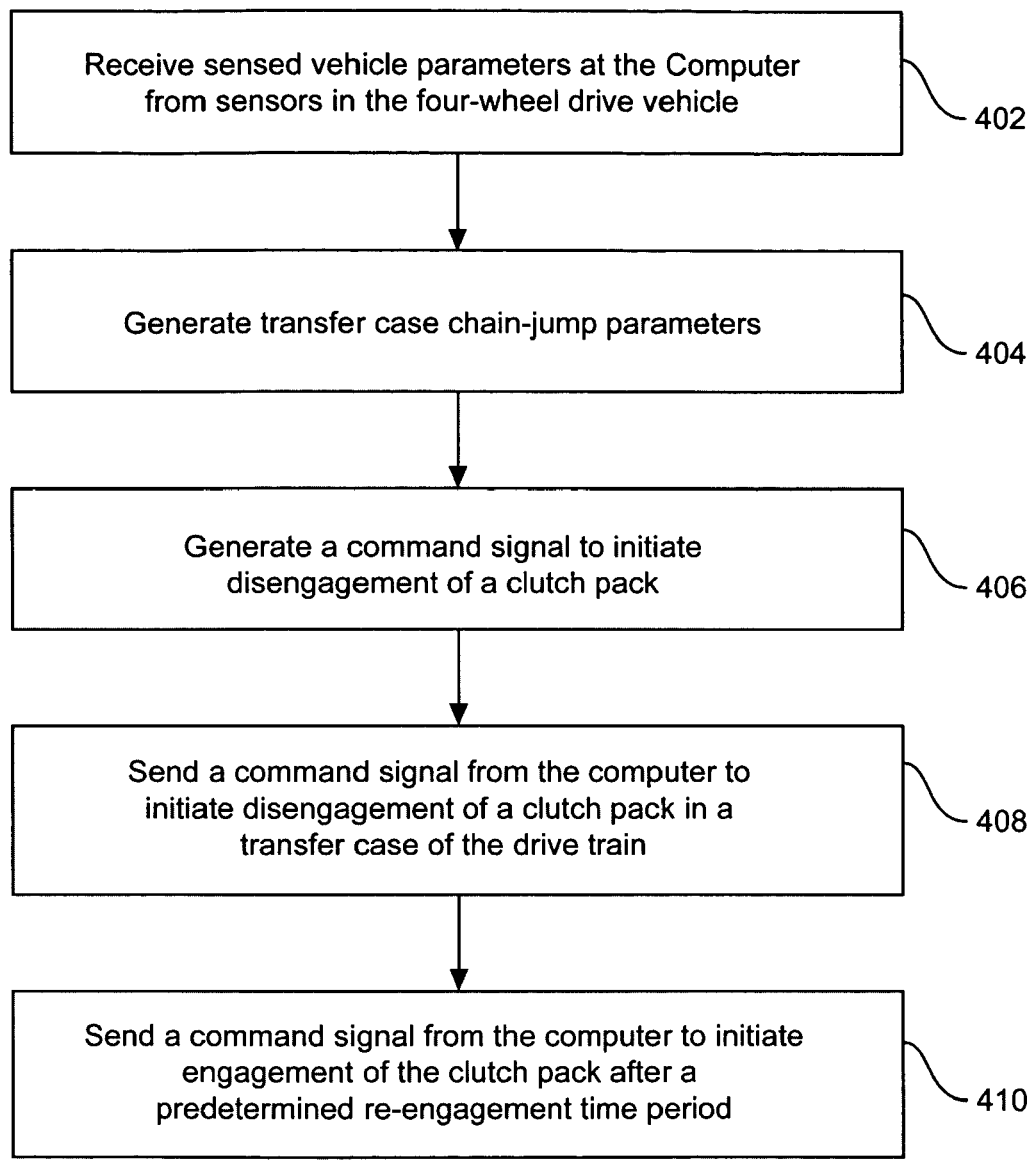
FIG. 4 illustrates a method of preventing chain jump in a four-wheel drive vehicle.

In FIG. 4, the methodology of preventing chain jump in a four-wheel drive vehicle 10 of the present invention is illustrated in flowchart form as method 400. One or more of the computer 50, the controller 57, the sensors 55 have stored in computer readable medium at least one computer program including computer readable code to perform the operations described with reference to method 400.

At block 402, the computer 50 receives sensed vehicle parameters from sensors 55 in the power train 15 and the drivetrain 25 of the four-wheel drive vehicle 10. A plurality of sensors 55 are positioned at various locations in the four-wheel drive vehicle 10 to sense a variety of vehicle parameters and to transmit sensor signals indicative of the sensed vehicle parameters to the computer 50. The sensor signals are continuously sent to the computer 50. In one embodiment, the sensor signals are periodically sent to the computer 50. The sensor signals generated by the plurality of sensors 55 are transmitted to the computer 50 via a network or data bus in the four-wheel drive vehicle 10.

Mode sensors measure the position of the clutch pack 60 to sense the mode of operation of the on-demand four-wheel drive vehicle 10. The mode of operation for on-demand four-wheel drive vehicles 10 includes the four-wheel mode and the two-wheel mode.

If the four-wheel drive vehicle 10 is an active full-time four-wheel drive vehicle 10, which always has four-wheel drive mode, there is no mode sensor on the four-wheel drive vehicle 10. In one embodiment in which the four-wheel drive vehicle 10 is an active full-time four-wheel drive vehicle 10, a mode sensor on the four-wheel drive vehicle 10 senses if the clutch pack 60 is partially engaged or fully engaged.

Rotation sensors are operable to sense the angular velocity or rotational speed of portions of the power train 15, such as the engine crankshaft (not shown). Rotation sensors also sense the angular velocity of portions of the drivetrain 25, such as one or more of the mainshaft 28, the pair of front wheels 40, the front axle 32, the front driveshaft 29, the pair of rear wheels 42, the rear axle, and/or the rear driveshaft 27.

Throttle sensors to measure the throttle levels are located at the throttle body (not shown) in the engine 18 and the throttle pedal (not shown) of the four-wheel drive vehicle 10. The throttle pedal throttle sensor measures the angle of the throttle pedal with respect to a predetermined plane and the throttle body sensor measures a throttle value.

Sensors measure the rate at which the engine 18 is being fueled, the engine speed, the operational state of the torque converter (not shown), and the active gear ratio of the transmission 20. The computer 50 receives the input from these sensors and calculates the torque on the various axles and/or driveshafts. In one embodiment, torque sensors measure the torque directly.

At block 404, the computer 50 generates transfer case chain-jump parameters by applying one or more algorithms stored in a memory (not shown) of the computer 50 on the sensed vehicle parameters received at block 402; The transfer case chain-jump parameters indicate if the four-wheel drive vehicle 10 is in a mode of operation in which the chain 66 is likely to jump over a tooth (not shown) of the drive sprocket 62 and/or the driven sprocket 64.

Transfer case chain-jump parameters include, for example, the mode of operation of the four-wheel drive vehicle 10, the vehicle speed, the throttle levels, rates of change in the throttle levels, relative torque values between various shafts and/or axles in the four-wheel drive vehicle 10, and rates of change of the relative torque values between various shafts and/or axles in the four-wheel drive vehicle 10.

The computer 50 applies an algorithm stored in a computer memory on one or more rotation signals received from rotation sensors to calculate the speed of the four-wheel drive vehicle 10. In one embodiment, the rotation sensors include processors (not shown) to calculate the vehicle speed and the rotation sensors send the calculated speed as a data signal to the computer 50.

The computer 50 applies an algorithm on one or more throttle signals received from the throttle sensors. The algorithm compares the throttle values with a maximum throttle value for the four-wheel drive vehicle 10. The algorithm also calculates a rate of change of throttle values and compares the rate of change with a threshold rate of change for a chain-jump event. The computer 50 has stored in a memory a maximum throttle value for the four-wheel drive vehicle 10.

In one embodiment, computer 50 calculates the relative torque values between the front axle assembly 30 and the rear axle assembly 33 and the relative rate of change in the torque values between the front axle assembly 30 and the rear axle assembly 33. The measured relative torque values and relative rate of change in the torque values are compared to a threshold relative-torque value and a threshold relative-torque rate of change value for a chain-jump event, respectively.

At block 406, the computer 50 generates a command signal to initiate disengagement of the clutch pack 60 based on the transfer case chain-jump parameters generated at block 404. The computer algorithm compares the transfer case chain-jump parameters with chain-jump threshold values or a range of chain-jump values. If all the transfer case chain-jump parameters meet or exceed the chain-jump threshold or are within the range of chain-jump values, the computer 50 determines that the chain 66 is likely to jump over a tooth of the drive sprocket 62 and/or the driven sprocket 64. The computer 50 then generates the command signal to initiate disengagement of the clutch pack 60. If the four-wheel drive vehicle 10 is an active full-time four-wheel drive vehicle the command signal to initiate disengagement of the clutch pack 60 is a command to initiate a partial disengagement of the clutch pack 60.

Chain jump in the transfer case 26 can happen when the front driveshaft 29 and the rear driveshaft 27 are locked together and the front axle 32 or rear axle 36 stops moving, while the rear axle 36 or the front axle 32, respectively, continues to move. When the four-wheel drive vehicle 10 is being driven in the four-wheel drive mode and the brakes are simultaneously applied to all wheels, the pair of front wheels 40 can stop rotating before the pair of rear wheels 42 if the front brakes (not shown) are larger and/or more powerful than the rear brakes (not shown). Alternatively, if the four-wheel drive vehicle 10 is being driven in the four-wheel drive mode and the brakes are simultaneously applied to all wheels, the pair of rear wheels 42 can stop rotating before the pair of front wheels 40 if the rear brakes are larger and/or more powerful than the front brakes. Typically, anti-lock brake systems simultaneously apply the brakes to all four wheels in the pair of front wheels 40 and the pair of rear wheels 42.

The chain-jump threshold values or a range of chain-jump values, which indicate that the chain 66 is likely to jump over a tooth of the drive sprocket 62 and/or the driven sprocket 64, can vary based on the vehicle design. In one case, the chain-jump threshold values or a range of chain-jump values include a vehicle speed that is less than 100 km/hour, an initial throttle level greater than 50% of the maximum throttle level stored in the memory of the computer 50, and a decrease in the throttle level from the initial throttle level to less than 10% of the maximum throttle level within a predetermined down-throttle time period. In this case, the four-wheel drive vehicle 10 has an anti-lock brake system. In one embodiment, the down-throttle time period is within a range of 0.1 seconds to 4 seconds. This case is liable to occur if the four-wheel drive vehicle 10 is subjected to high throttle while being driven in four-wheel drive mode and the driver applies the brakes, which are not part of an anti-lock brake system. When an anti-lock brake system comes on, the brake pressure modulation reduces torque since the pair of front wheels 40 and the pair of rear wheels 42 repeatedly stop and start. Without an active anti-lock brake system the front wheels lock up and a torque spike is transmitted through the front driveshaft 29 since the brakes instantaneously stop a majority of the inertia of the front wheels 40.

In another case, the chain-jump threshold values or a range of chain-jump values include a vehicle speed that is less than 10 km/hour, an initial throttle level greater than 50% of the maximum throttle level, and a decrease in throttle level from the initial throttle level to less than 10% of the maximum throttle level within the predetermined down-throttle time period. This case is liable to occur if the four-wheel drive vehicle 10 is subjected to high throttle while being driven in four-wheel drive mode at low speed, for example, the four-wheel drive vehicle 10 is being driven up a steep, dirt road, and the driver applies the brakes of an antilock brake system.

In yet another case, the chain-jump threshold values or a range of chain-jump values include a vehicle speed that is less than 100 km/hour, an initial throttle level is greater than 40% of the maximum throttle level, and a decrease in throttle level from the initial throttle level to less than 30% of the maximum throttle level within the predetermined down-throttle time period. This case is liable to occur if the four-wheel drive vehicle 10 is subjected to high throttle while being driven in four-wheel drive mode and the driver stops applying pressure to the throttle pedal.

In yet another case, chain-jump threshold values or a range of chain-jump values include a vehicle speed that is less than 10 km/hour, an initial throttle level greater than 40% of a maximum throttle level, and a decrease in throttle level from the initial throttle level to less than 30% of the maximum throttle level within the predetermined down-throttle time period. This case is liable to occur if the four-wheel drive vehicle 10 is subjected to high throttle while being driven in four-wheel drive mode at low speed and the driver stops applying pressure to the throttle pedal.

In yet another case, the chain-jump threshold values or a range of chain-jump values include a vehicle speed that is less than 10 km/hour and the rate of decreasing torque to the front axle 32 is twice the rate of decreasing torque to the rear axle 36.

In yet another case, the chain-jump threshold values or a range of chain-jump values include a vehicle speed that is less than 100 km/hour and the rate of decreasing torque to the front axle 32 is three times the rate of decreasing torque to the rear axle 36.

In yet another case, the chain-jump threshold values or a range of chain-jump values include a vehicle speed that is less than 10 km/hour, an initial throttle level greater than 40% of a maximum throttle level, and a brake pedal sensor senses that the brake has been applied. Other cases are possible.

At block 408, the computer 50 sends the command signal to initiate disengagement of the clutch pack 60 in the transfer case 26 of drivetrain 25 from the computer 50 responsive to the transfer case chain-jump parameters generated at block 406 meeting or exceeding the chain-jump threshold values or being within a range of chain-jump values. The command signal is sent from the computer 50 via a network or data bus in the four-wheel drive vehicle 10 to the controller 57. The controller 57 is operable to receive the command signal to initiate disengagement of a clutch pack. In response to receiving the command signal, the controller 57 provides an electrical and/or mechanical signal to the clutch pack 60 to disengage. The clutch pack 60 receives the electrical and/or mechanical signal and releases the drive sprocket 62. Thus, the mainshaft 28 and rear driveshaft 27 are disengaged from the front driveshaft 29 before the chain 66 has jumped over any teeth on the drive sprocket 62 and/or the driven sprocket 64. The clutch pack 60 is in the mode illustrated in FIG. 2, after the clutch pack 60 is disengaged. The disengagement is operable to mechanically separate the front driveshaft 29 from the rear driveshaft 27 to allow an angular velocity difference between the front driveshaft 29 and the rear driveshaft 27 and to prevent the chain 66 from jumping over a tooth of the driven sprocket 64 and the drive sprocket 62.

At block 410, the computer 50 sends a command signal to controller 57 within the transfer case 26 to initiate engagement of the clutch pack 60 after a predetermined re-engagement period. Specifically, the command signal to engage the clutch pack 60 is sent after enough time passes for the front axle 32 and the rear axle 36 to stop rotating. The time required for the axles to stop rotating is the predetermined re-engagement time period. In one embodiment, the predetermined re-engagement time period is within a range of about 2 seconds to about 10 seconds and is stored in a memory of the computer 50. In another embodiment, the predetermined re-engagement time period is within a range of about 1 second to about 15 seconds and is stored in a memory of the computer 50. In one embodiment, the passing of the predetermined re-engagement time period provides the time required for both the front axle 32 and the rear axle 36 to be rotating at the same rate.

The computer 50 initiates a clock when the command signal to initiate the disengagement of the clutch pack 60 is sent at block 408. When the clock reaches the predetermined re-engagement time period, the computer 50 sends the command signal to controller 57 to re-engage the clutch pack 60. In one embodiment, the computer 50 applies an algorithm to the transfer case chain jump parameters generated at block 404 to calculate the re-engagement time period. The controller 57, in response to receiving the command signal, provides the electrical and/or mechanical signals to the clutch pack 60 to engage. The clutch pack 60 then engages the drive sprocket 62 so that the front driveshaft 29 is engaged with the mainshaft 28 and rear driveshaft 27.

In one embodiment, the re-engagement occurs when sensors 55 send signals to the computer 50 indicating that the front driveshaft 29 and rear driveshaft 27 are rotating at the same speed. In this case, the computer 50 sends the command signal to controller 57 to re-engage the clutch pack 60. The clutch pack 60 then engages the drive sprocket 62 so that the front driveshaft 29 is engaged with the mainshaft 28 and rear driveshaft 27.

The driven sprocket 64 is mechanically connected to a respective one of the front driveshaft 29 or the rear driveshaft 27 of the drivetrain 25, wherein the engagement is operable to mechanically connect the rear driveshaft 27 to the front driveshaft 29 so that the rear driveshaft 27 and the front driveshaft 29 rotate with the same angular velocity. The clutch pack 60 is in the mode illustrated in FIG. 3, after the clutch pack 60 is engaged.

If the four-wheel drive vehicle 10 is an active full-time four-wheel drive vehicle the command signal to initiate engagement of the clutch pack is a command to initiate full engagement of the clutch pack 60.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A method to prevent chain jump over a tooth of a sprocket in a transfer case of a four-wheel drive vehicle, the transfer case having a chain drive that couples a respective front and rear driveshaft sprocket, the method comprising:
   receiving sensed vehicle parameters from sensors in the four-wheel drive vehicle;
   generating transfer case chain-jump parameters based on the sensed vehicle parameters, wherein the chain-jump parameters are indicative of the vehicle being in a mode of operation in which the chain is likely to jump over a tooth of a sprocket; and
   sending a command signal to initiate disengagement of a clutch pack in the transfer case responsive to the generated transfer case chain-jump parameters.

2. The method of claim 1, wherein the four-wheel drive vehicle is an active full-time four-wheel drive vehicle, and
   wherein the command signal to initiate disengagement of the clutch pack is a command to initiate a partial disengagement of the clutch pack.

3. The method of claim 1, further comprising:
   sending a command signal to initiate engagement of the clutch pack after a predetermined re-engagement time period.

4. The method of claim 3, wherein the four-wheel drive vehicle is an active full-time four-wheel drive vehicle, and
   wherein the command signal to initiate disengagement of the clutch pack is a command to initiate partial disengagement of the clutch pack and the command signal to initiate engagement of the clutch pack is a command to initiate full engagement of the clutch pack.

5. The method of claim 3, wherein the re-engagement time period is within a range of 2 to 10 seconds.

6. The method of claim 3, wherein the engagement of the clutch pack includes:
   engaging a drive sprocket with one of a rear driveshaft or a front driveshaft of the drivetrain, wherein
   the drive sprocket is mechanically connected to a chain;
   the chain is mechanically connected to a driven sprocket; and
   the driven sprocket is mechanically connected to a respective one of the front driveshaft or the rear driveshaft of the drivetrain, wherein the engagement is operable to mechanically connect the rear driveshaft to the front driveshaft.

7. The method of claim 6, wherein the drive sprocket is engaged with the rear driveshaft and the rear driveshaft includes a mainshaft of the drivetrain.

8. The method of claim 6, wherein the drive sprocket is engaged with the front driveshaft and the front driveshaft includes a mainshaft of the drivetrain.

9. The method of claim 1, wherein the disengagement of the clutch pack includes:
   disengaging a drive sprocket from one of a rear driveshaft or a front driveshaft of the drivetrain, wherein:
   the drive sprocket is mechanically connected to a chain;
   the chain is mechanically connected to a driven sprocket; and
   the driven sprocket is mechanically connected to a respective one of a front driveshaft or a rear driveshaft of the drivetrain, wherein the disengagement is operable to mechanically separate the front driveshaft from the rear driveshaft.

10. The method of claim 9, wherein the four-wheel drive vehicle is an active full-time four-wheel drive vehicle, and
    wherein disengaging a drive sprocket from one of the rear driveshaft or the front driveshaft of the drivetrain is a partial disengaging of the drive sprocket from one of the rear driveshaft or the front driveshaft.

11. The method of claim 1, wherein the transfer case chain-jump parameters consist of a vehicle speed less than 100 km/hour, an initial throttle level greater than 50% of a maximum throttle level, and a decrease in the initial throttle level to less than 10% of the maximum throttle level.

12. The method of claim 1, wherein the transfer case chain-jump parameters consist of a vehicle speed less than 10 km/hour, an initial throttle level greater than 50% of a maximum throttle level, and a decrease in the initial throttle level to less than 10% of the maximum throttle level.

13. The method of claim 1, the transfer case chain-jump parameters consist of a vehicle speed less than 100 km/hour, an initial throttle level greater than 40% of a maximum throttle level, a decrease in the initial throttle level to less than 30% of the maximum throttle level.

14. The method of claim 1, the transfer case chain-jump parameters consist of a vehicle speed less than 10 km/hour, an initial throttle level greater than 40% of a maximum throttle level, a decrease in the initial throttle level to less than 30% of the maximum throttle level.

15. The method of claim 1, wherein the transfer case chain-jump parameters are sensed during a predetermined down-throttle time period, 16. The method of claim 15, wherein the down-throttle time period is within a range of 0.1 seconds to 4 seconds.

17. A system to prevent chain jump over a tooth of a sprocket in a transfer case of a four-wheel drive vehicle, the transfer case having a chain drive that couples a respective front and rear driveshaft sprocket, the system comprising:
    sensors operable to sense vehicle parameters in the four-wheel drive vehicle;
    a computer operable to receive the sensed vehicle parameters from the sensors, to generate transfer case chain-jump parameters, wherein the chain-jump parameters are indicative of the vehicle being in a mode of operation in which the chain is likely to jump over a tooth of a sprocket based on the sensed vehicle parameters, and to send a command signal to initiate disengagement of a clutch pack in a transfer case responsive to the generated transfer case chain-jump parameters; and
    a controller operable to receive the command signal to initiate disengagement of a clutch pack.

18. The system of claim 17, wherein the computer sends a command signal to initiate engagement of the clutch pack after a predetermined re-engagement time period.

* * * * *